(12) United States Patent
de Martrin-Donos et al.

(10) Patent No.: US 11,252,982 B2
(45) Date of Patent: Feb. 22, 2022

(54) EGG POACHER

(71) Applicant: Helen of Troy Limited, St. Michael (BB)

(72) Inventors: Francois de Martrin-Donos, Brooklyn, NY (US); Charlie Paradise, Brooklyn, NY (US); Laura Sink, Germantown, NY (US); Meegan Daigler, Brooklyn, NY (US); Mark Steven Drayer, New York, NY (US); Patrick Zay, Guttenberg, NJ (US); Rebecca del Monte, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 377 days.

(21) Appl. No.: 16/366,144

(22) Filed: Mar. 27, 2019

(65) Prior Publication Data
US 2019/0216114 A1 Jul. 18, 2019

Related U.S. Application Data

(62) Division of application No. 15/332,065, filed on Oct. 24, 2016, now Pat. No. 10,278,412.

(51) Int. Cl.
*A23L 15/00* (2016.01)
*A47J 29/02* (2006.01)

(52) U.S. Cl.
CPC .............. *A23L 15/00* (2016.08); *A47J 29/02* (2013.01); *A23V 2002/00* (2013.01)

(58) Field of Classification Search
CPC ....... A23L 15/00; A47J 29/02; A23V 2002/00
USPC ........................... 99/322, 348, 417, 440, 449
See application file for complete search history.

(56) References Cited

U.S. PATENT DOCUMENTS

| 211,859 | A | * | 2/1879 | Manley | ................... | B28B 1/261 |
| | | | | | | 249/108 |
| 2,186,855 | A | * | 1/1940 | Baccarini | ............... | A47J 29/00 |
| | | | | | | 99/417 |
| 2,454,054 | A | | 11/1948 | Gibb | | |
| 3,369,480 | A | | 2/1968 | Dreyfus | | |
| 3,749,001 | A | | 7/1973 | Swett | | |
| 4,133,996 | A | | 1/1979 | Fread | | |

(Continued)

FOREIGN PATENT DOCUMENTS

| CN | 2719164 | 8/2005 |
| CN | 104305870 | 1/2015 |

(Continued)

OTHER PUBLICATIONS

International Search Report filed in PCT/US2016/064912 dated Feb. 16, 2017.

*Primary Examiner* — Thien S Tran
(74) *Attorney, Agent, or Firm* — Rankin, Hill & Clark LLP

(57) ABSTRACT

A cooking device suitable for cooking an associated food item includes a body including an upper portion, a lower portion, and an aperture between the upper and lower portions. Each of the upper and lower portions is configured to receive the associated food item and the aperture adapted to allow the associated food item to travel from the upper portion to the lower portion. The lower portion has at least one opening arranged to allow an associated cooking fluid to flow into the lower portion allowing the lower portion in use to become at least partially submerged in the associated cooking fluid.

17 Claims, 10 Drawing Sheets

(56) References Cited

U.S. PATENT DOCUMENTS

| | | | |
|---|---|---|---|
| 6,329,004 B1 | 12/2001 | Fernandez | |
| 6,598,515 B1 | 7/2003 | Bove | |
| 7,678,271 B2 | 3/2010 | Curtin | |
| 2007/0181489 A1* | 8/2007 | Lee | A47J 43/24 210/473 |
| 2008/0230462 A1* | 9/2008 | Curtin | A47J 43/24 210/232 |
| 2012/0207891 A1* | 8/2012 | Pantaleo | A47J 29/02 426/300 |
| 2016/0073815 A1* | 3/2016 | Lambert | A47J 29/02 99/440 |

FOREIGN PATENT DOCUMENTS

| | | |
|---|---|---|
| CN | 105707737 | 6/2016 |
| GB | 191213748 | 5/1913 |
| GB | 854353 | 11/1960 |
| GB | 2519174 | 4/2015 |
| JP | H01281059 | 11/1989 |
| JP | 2011245130 | 12/2011 |

* cited by examiner

US 11,252,982 B2

EGG POACHER

The present application claims priority to U.S. patent application Ser. No. 15/332,065, filed on Oct. 24, 2016, the disclosure being incorporated herein by reference.

BACKGROUND

Eggs may be poached by cracking them from their shells and then simmering them gently in a cooking fluid, such as a pan of water. However, the raw white of the egg has a tendency to disperse in the water. Egg poachers are popular devices to facilitate in the preparation of poached eggs. While known egg poaches differ in appearance and construction, they typically comprise a cup-shaped receptacle that is designed to contain or coddle the egg so as to prevent it from contacting the water. The receptacle is either suspended in the water by engagement with a framework over the pan, or else is allowed to float freely in the pan. While such a known device may prevent the dispersal of the raw egg white, the finished item is often overly firm, sometimes described as "rubbery" in texture, and is of a completely regular shape (i.e. that of the receptacle). Therefore, the use of this type of known device causes the egg white to lose the delicateness that is associated with a poached egg, because it is generally being cooked by a contacting surface which is heated by the water instead of the heated water itself. Some competitors attempt to get around this by implementing a mesh-based "vessel" design, but the egg tends to cling to the mesh, resulting in a damaged egg with a mess left to clean.

SUMMARY

According to one aspect, a cooking device suitable for cooking an associated food item comprises a body including an upper portion, a lower portion, and an aperture between the upper and lower portions. Each of the upper and lower portions is configured to receive the associated food item and the aperture adapted to allow the associated food item to travel from the upper portion to the lower portion. The lower portion has at least one opening arranged to allow an associated cooking fluid to flow into the lower portion allowing the lower portion in use to become at least partially submerged in the associated cooking fluid.

According to another aspect, an egg poacher comprises a unitary, one-piece body formed of a flexible material. The body includes a cup or funnel shaped upper portion, a lower portion having an open bottom, and an aperture between the upper and lower portions.

According to another aspect, a method of poaching an egg comprises providing a cooking device in a cooking vessel containing cooking fluid or to be filled with cooking fluid, the cooking device including a body having a cup or funnel shaped upper portion, a lower portion having an open bottom, and an aperture between the upper and lower portions; at least partially immersing the lower portion in the cooking fluid as the lower portion rests upon a floor of the cooking vessel; introducing a raw egg in the upper portion, wherein the aperture is sized such that raw egg yolk is generally wrapped in raw egg white as the raw egg falls through the aperture toward the lower portion; and containing the raw egg in the lower portion while cooking.

DETAILED DESCRIPTION

Figure 1:
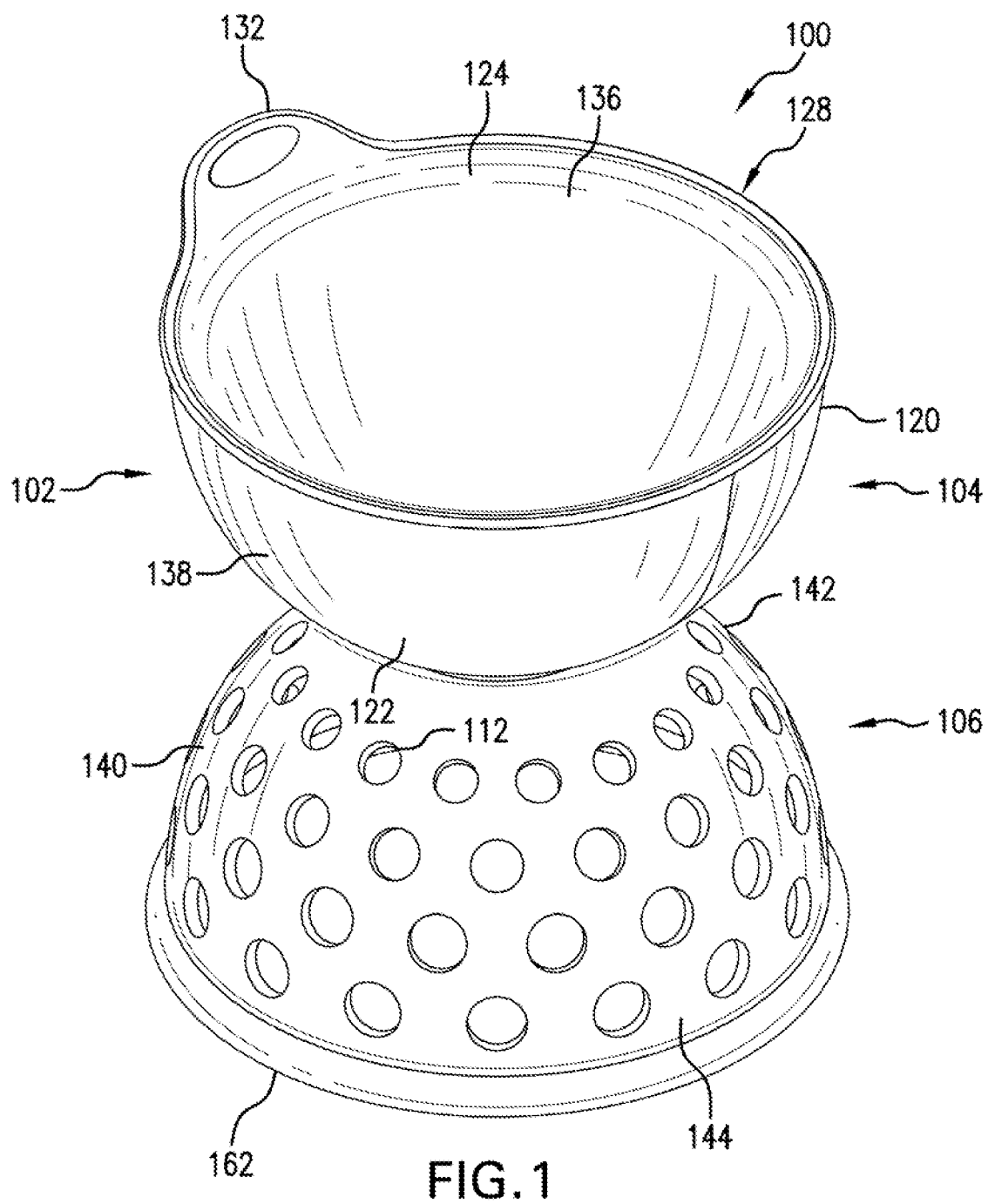
FIGS. 1 and 2 are perspective views of an exemplary egg poacher according to the present disclosure.
Figure 2:
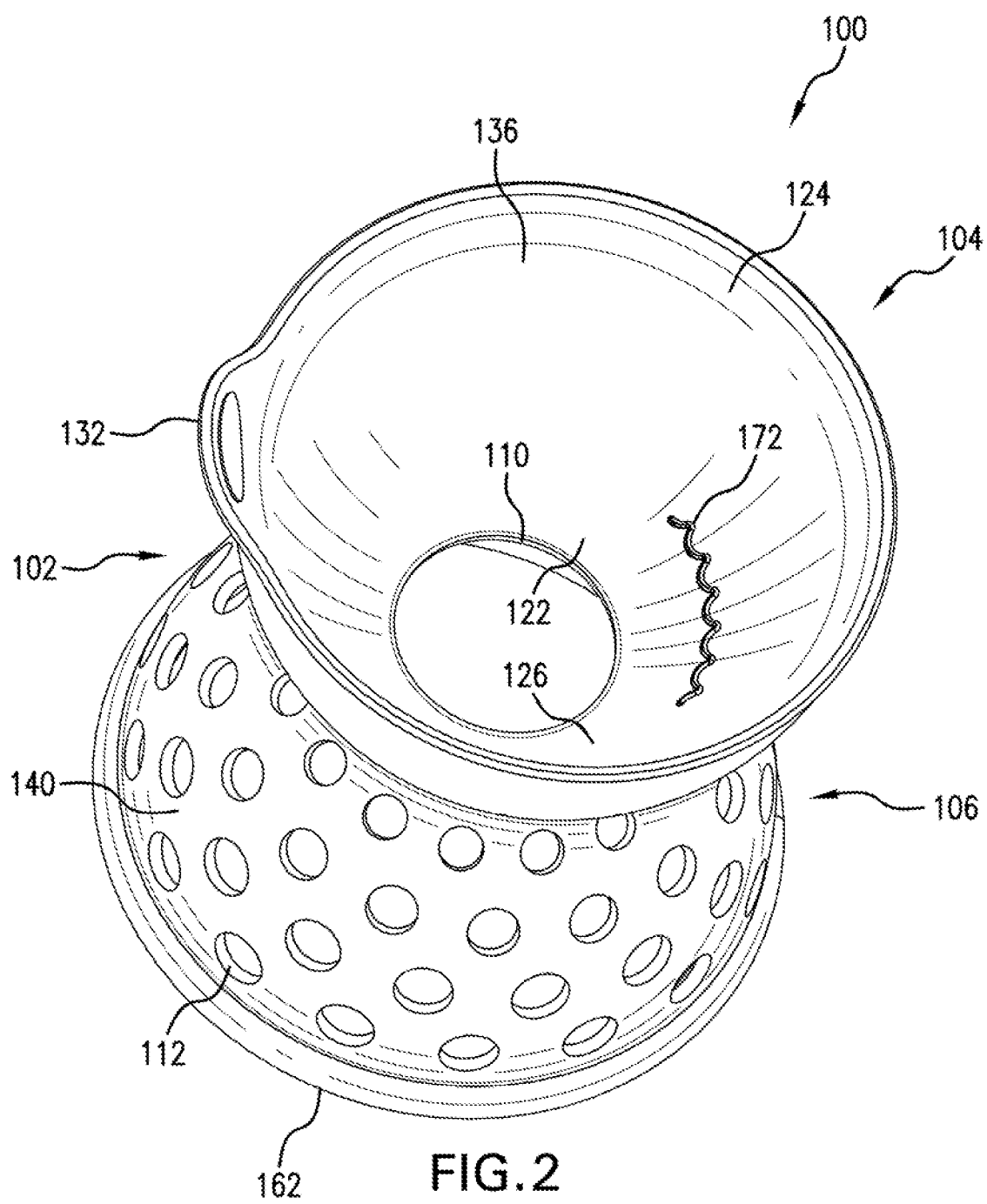
Figure 3:
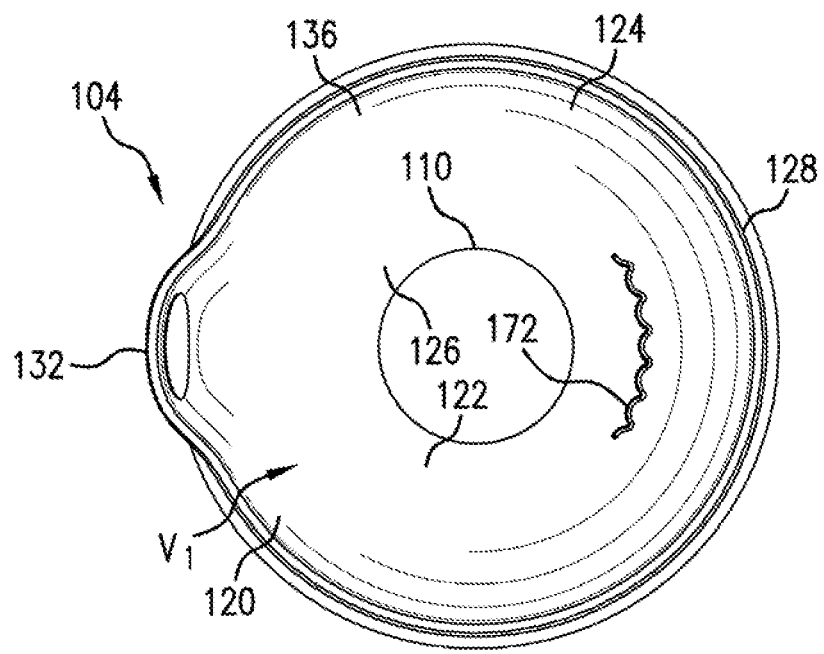
FIGS. 3 and 4 are plan views of the egg poacher.
Figure 4:
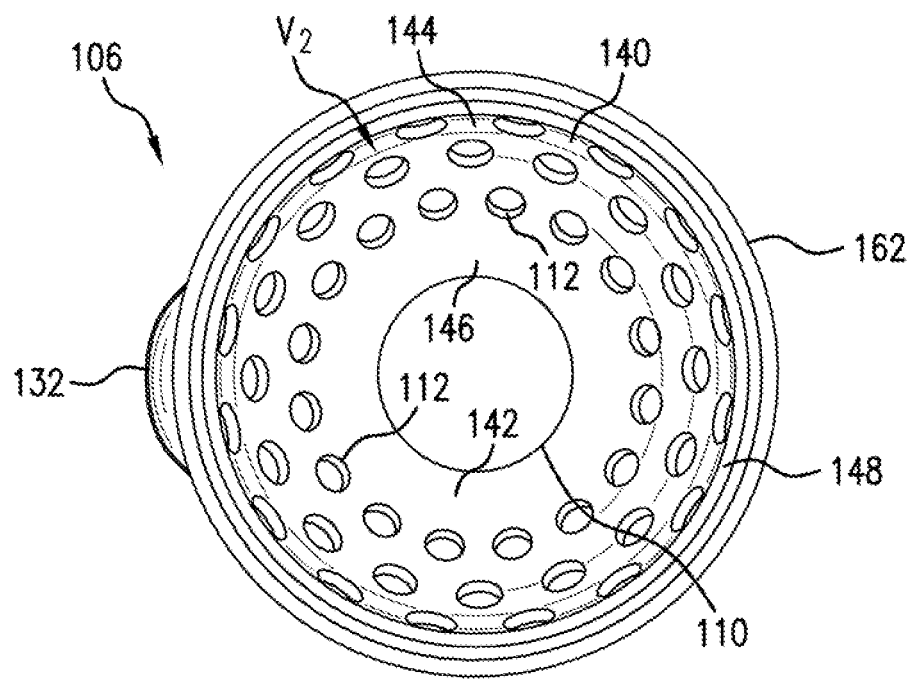
Figure 5:
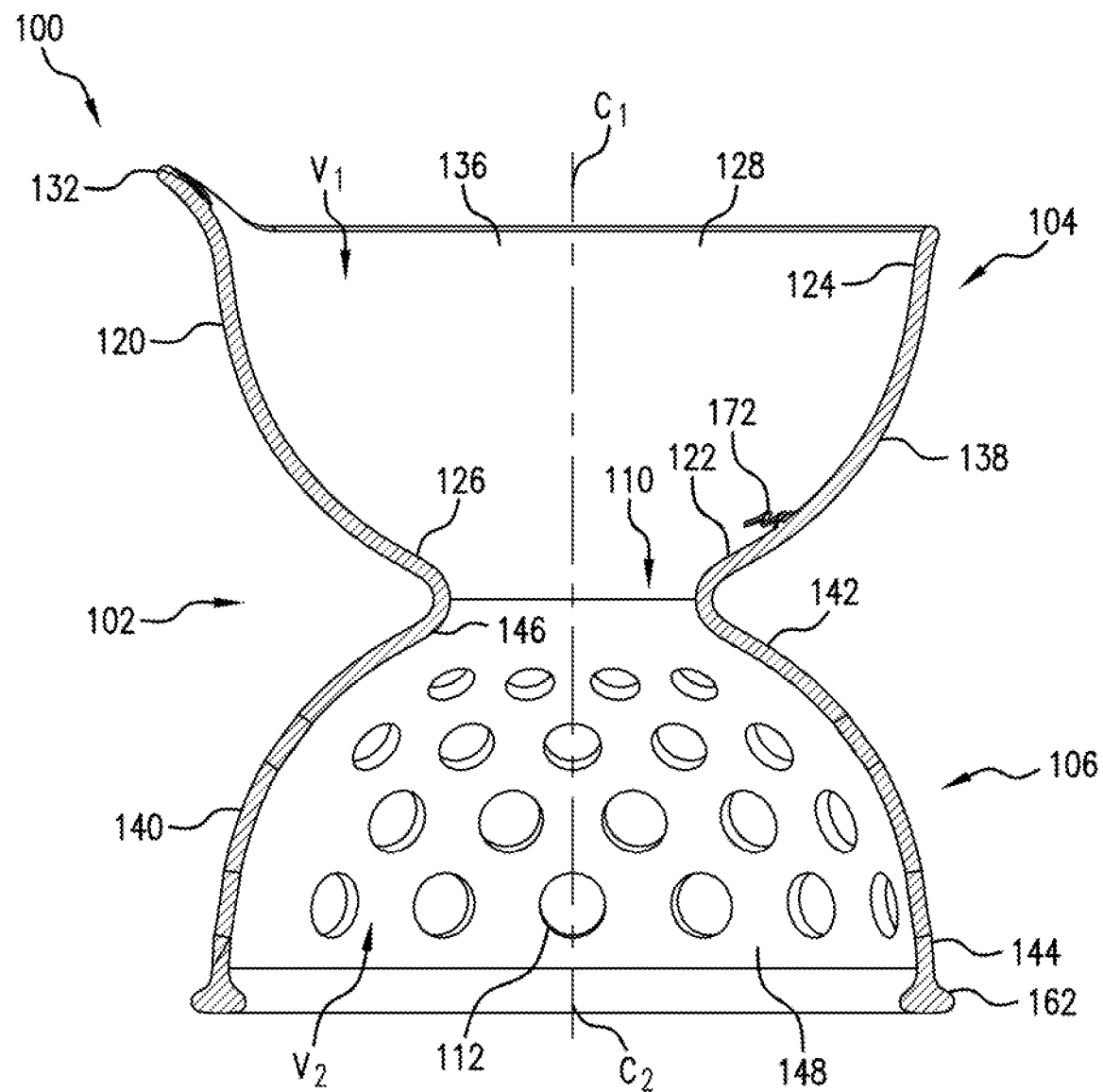
FIG. 5 is a cross-sectional view of the egg poacher.
Figure 6:
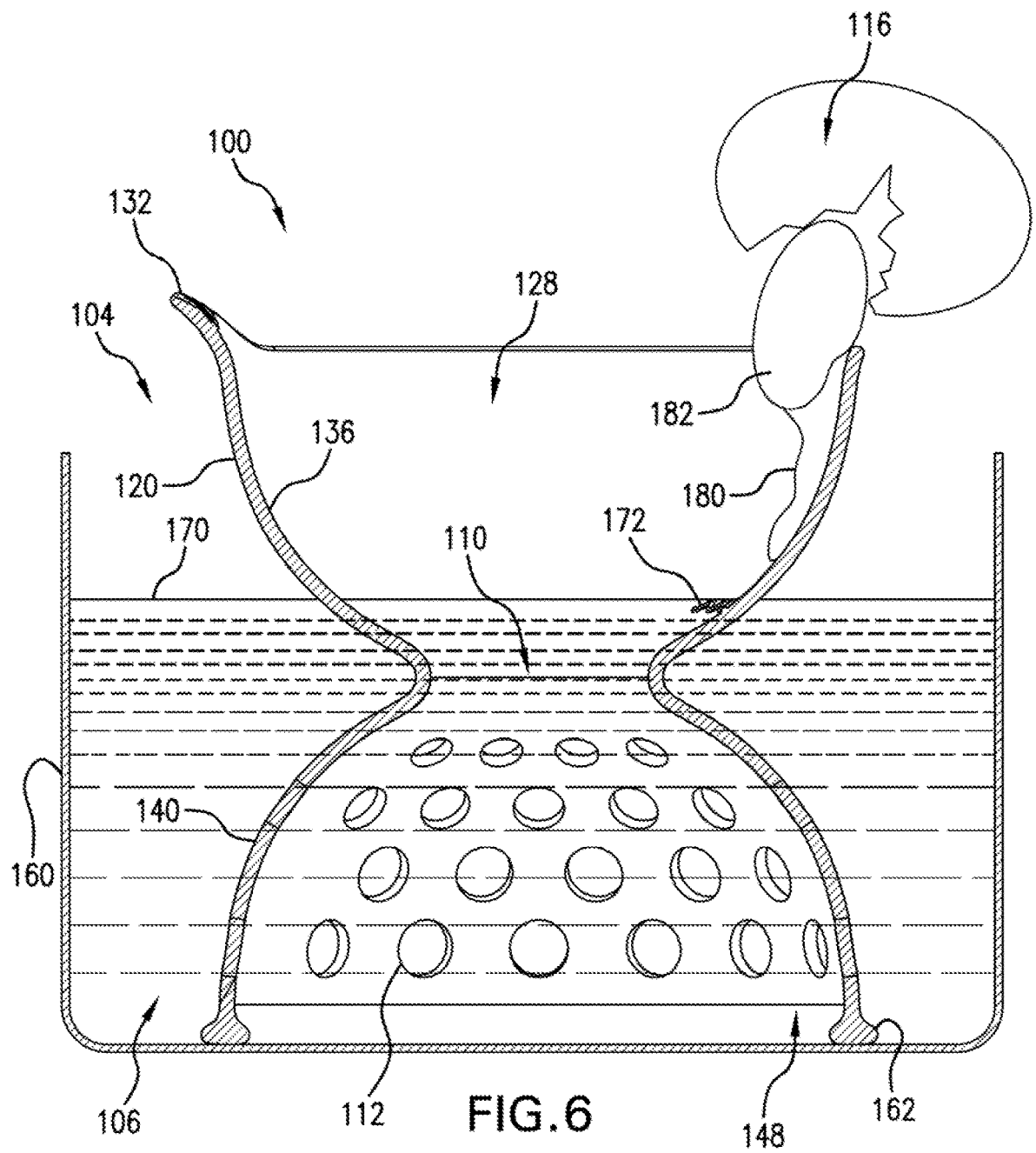
FIGS. 6-10 depict an exemplary method of use of the egg poacher.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-5 illustrate an exemplary cooking device 100 suitable for cooking an associated food item according to the present invention. In general, the cooking device 100 comprises a body 102 including an upper portion 104, a lower portion 106, and an aperture 110 between the upper and lower portions 104, 106. Each of the upper and lower portions 104, 106 is configured to receive the associated food item and the aperture 110 is adapted to allow the associated food item to travel from the upper portion 104 to the lower portion 106. According to one aspect, the lower portion 106 can have at least one opening (e.g., the depicted perforation 112) arranged to allow an associated cooking fluid to flow into the lower portion 106 allowing the lower portion in use to become at least partially submerged in the associated cooking fluid. As will be described herein, the cooking device 100 is an egg poacher and the associated food item is an egg 116 (see FIG. 6).

Figure 7:
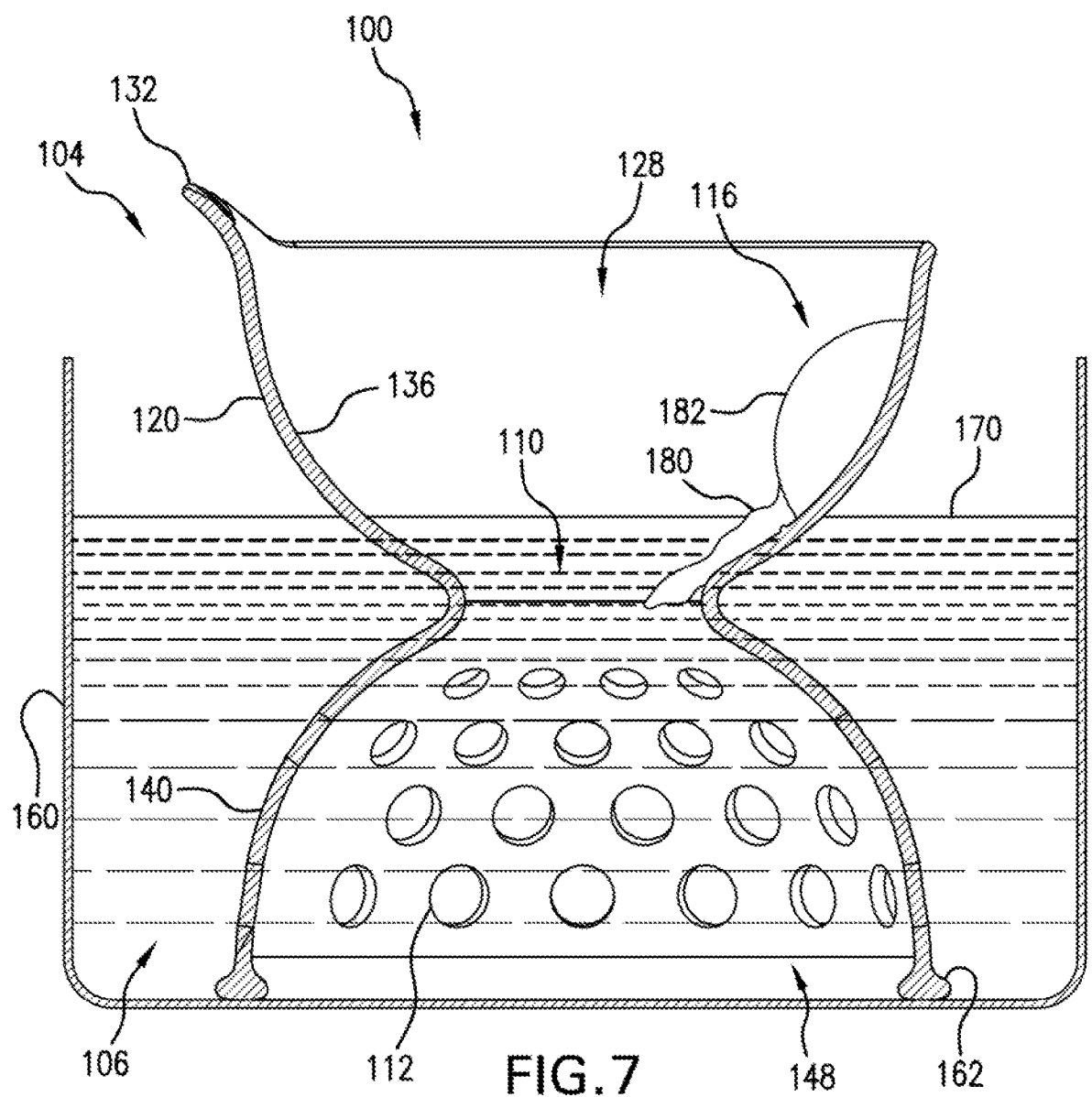

The upper portion 104 of the egg poacher 100 includes a first side wall 120 having opposite end portions 122, 124, and a first base 126 located at the end portion 122. The end portion 124 of the first side wall 120 defines a first opening 128 for introduction of the egg 116 into the egg poacher 100. An engagement tab 132 projects outwardly from the end portion 124. The engagement tab 132 is configured to allow a user to grasp the egg poacher 100 in use. As an alternative the upper portion 104 may comprise loops, hooks or projections which allow the user to grasp the egg poacher 100. The first side wall includes an inner surface 136 and an outer surface 138. As depicted, the inner surface 136 is a substantially smooth surface that is continuous and without interruption (i.e., the inner surface is substantially devoid of a projection and/or recess). The outer surface 138 can also be substantially smooth; although, the outer surface 138 can include features (e.g., projections) which allow the user to easily grasp the egg poacher 100. The first side wall 120 and the first base 126 together define a first volume $V_1$ of the upper portion 104. In the depicted aspect, the upper portion 104 is cup or funnel shaped with the aperture 110 extending through the first base 126. This shape of the upper portion 104 together with the substantially smooth inner surface 136 allows the food item or egg 116 to gently move along the inner surface 136 of the first side wall 120 toward the aperture 110 without the raw egg white separating from the raw egg yolk (see FIG. 7). Although, it should be appreciated that alternative configurations for the upper portion 104 are contemplated, the requirement being that the raw egg is not disrupted as it moves toward the aperture 110.

Similar to the upper portion 104, the lower portion 106 of the egg poacher 100 includes a second side wall 140 having opposite end portions 142, 144, and a second base 146 located at the end portion 142. According to one aspect, the at least one opening of the lower portion 106 can include a second opening 148 at the end portion 144 of the second side wall 140 (the second opening 148 defining an open bottom of the lower portion 106). The second side wall 140 and the second base 146 together define a second volume $V_2$ of the lower portion 106, and according to one embodiment of the egg poacher 100, the second volume $V_2$ is approximately equal to the first volume $V_1$ of the upper portion 104. In the depicted aspect, the lower portion 106 is also cup or funnel shaped and has an inverted orientation relative to the upper portion 104 with the aperture 110 extending through the second base 146. Again, it should be appreciated that alternative configurations for the lower portion 106 are contemplated. As indicated above, according to one aspect, the at least one opening of the lower portion 106 can include the at least one perforation 112 located on the second side wall 140 of the lower portion 106. The at least one perforation 112 can have a variety of shapes (e.g. circular, oval, obround, polygonal) which will allow the associated cooking fluid to flow into the lower portion 106. In the illustrated aspect, the second side wall 140 of lower portion 106 is provided with a plurality of circular shaped perforations 112; although, this is not required. For example, instead of the depicted configuration of the lower portion 106, the second side wall 140 can include a single perforation having an enlarged dimension as compared to the dimensions of the perforations 112. Further, the lower portion 106 is configured to support the egg poacher 100 on supporting surface, such as a bottom or floor of an associated cooking vessel 160 in use (see FIGS. 6-9). By way of example, the end portion 144 of the second side wall 140 can include a support member 162 provided at least partially about its periphery. The support member 162 can be in the form of a lip or rim and can frame the second opening 148. Alternatively, the lower portion 106 can have molded feet to allow the egg poacher 100 to stand on a supporting surface.

Figure 11:
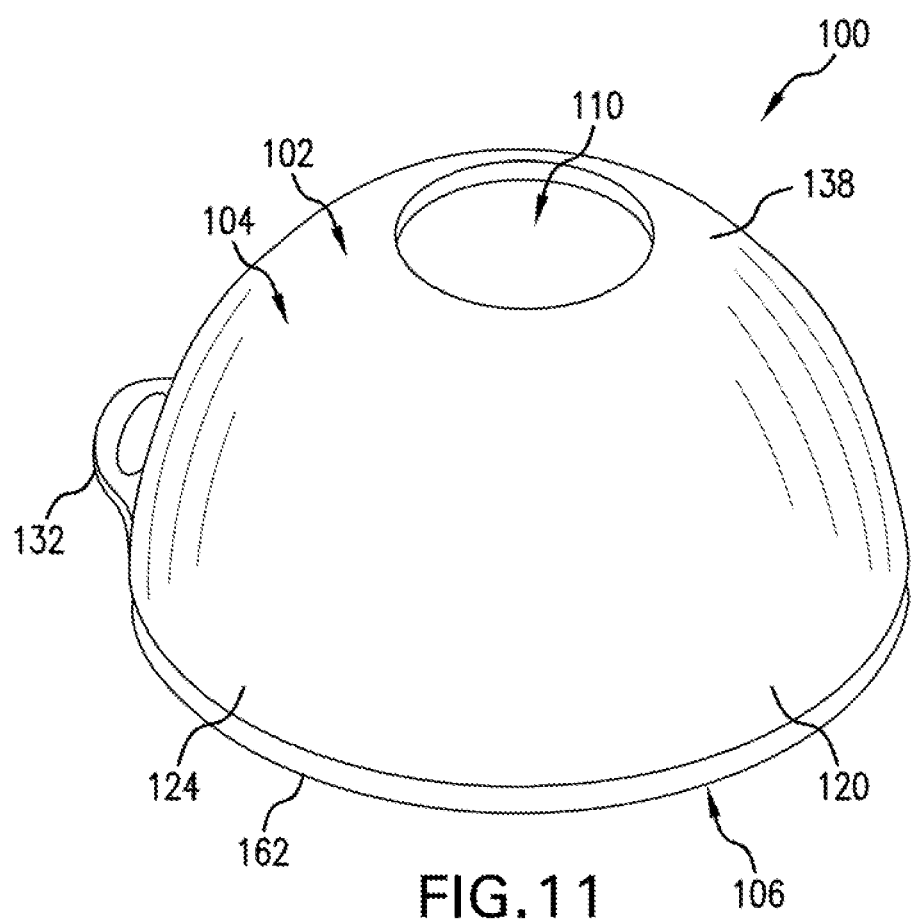
FIG. 11 is a perspective view of the egg poacher in a stored condition.

In the depicted aspect of the egg poacher 100, the body 102 is a unitary, one-piece part formed of a flexible material (e.g., a silicone material). The upper portion 104 defines a first longitudinal axis $C_1$, and the lower portion 106 defines a second longitudinal axis $C_2$ that is aligned with the first longitudinal axis. Further, the lower portion 106 is substantially a mirror image of the upper portion 104 with respect to a plane separating the upper and lower portions 104, 106 and transverse to longitudinal axis of the body 102 (which is defined by the first and second longitudinal axes $C_1$ and $C_2$). As shown in FIG. 11, with the upper and lower portions 104, 106 being mirror images of one another, and by forming the body 102 of a flexible material, the cup or funnel-shaped upper portion 104 is configured to at least partially fold over the cup or funnel-shaped lower portion 106. This, in turn, allows for compact storage of the egg poacher 100.

An exemplary method of using the cooking device 100 to poach an egg 116 will now be described with reference to FIG. 6-10. The egg poacher 100 is placed in the cooking vessel 160 and is supported on the bottom of the cooking vessel 160 via the support member 162. The cooking vessel 160 is then at least partially filled with a cooking fluid (e.g., water) 170 until a level of the cooking fluid 170 is approximately at a fill line 172 located on the inner surface 136 of the first side wall 120 (the fill line 172 indicates an optimal amount of cooking fluid to be used). It should be appreciated that the cooking vessel 160 can be at least partially filled with the cooking fluid 170 prior to the placement of the egg poacher 100 in the cooking vessel 160. Regardless of when the cooking vessel 160 is at least partially filled with the cooking fluid 170, the at least one perforation 112 provided on the second side wall 140 of the lower portion 106 allows the cooking fluid 170 to flow into the lower portion 106 which, in turn, maintains the lower portion at least partially immersed in the cooking fluid 170 as the lower portion rests upon the bottom of the cooking vessel 160. The cooking fluid 170 is then heated to a gentle boil. During cooking the cooking fluid 170 should be kept at a simmer and should not be allowed to boil vigorously, as boiling can cause the egg to produce an unappetizing foam in the cooking vessel 170 and potentially boil over and can cause the egg white to lose its delicateness.

Figure 8:
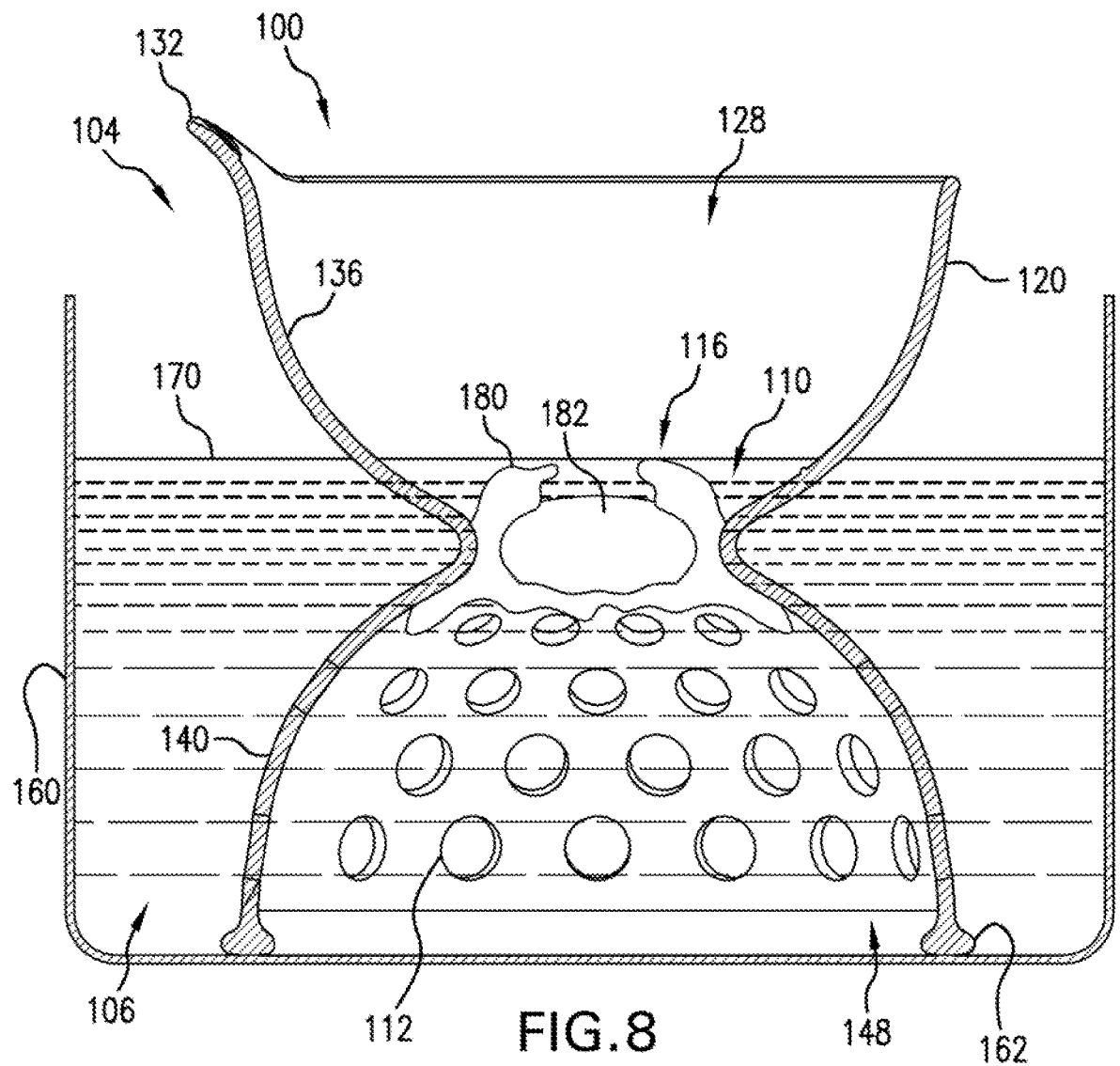
Figure 9:
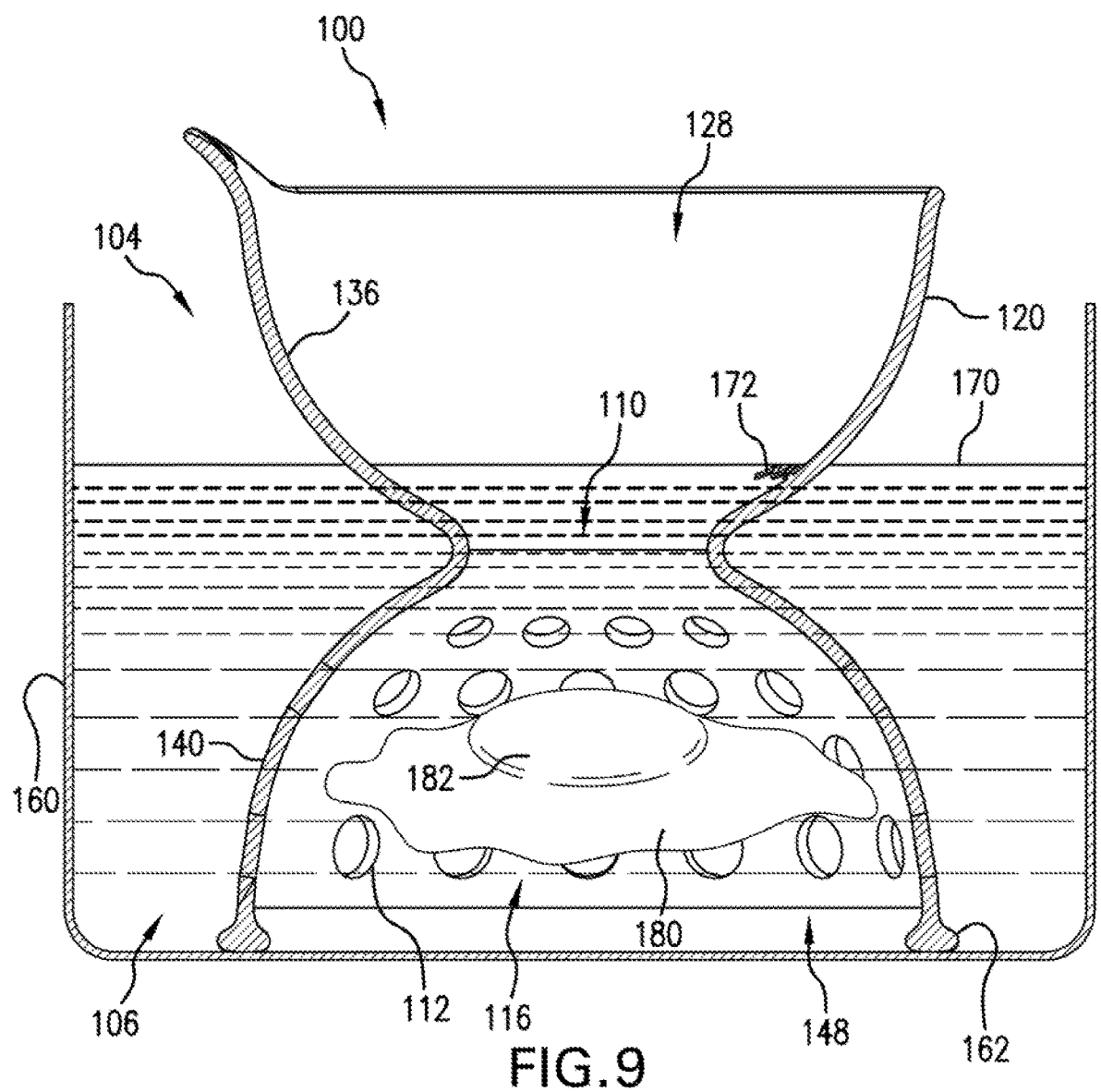
Figure 10:
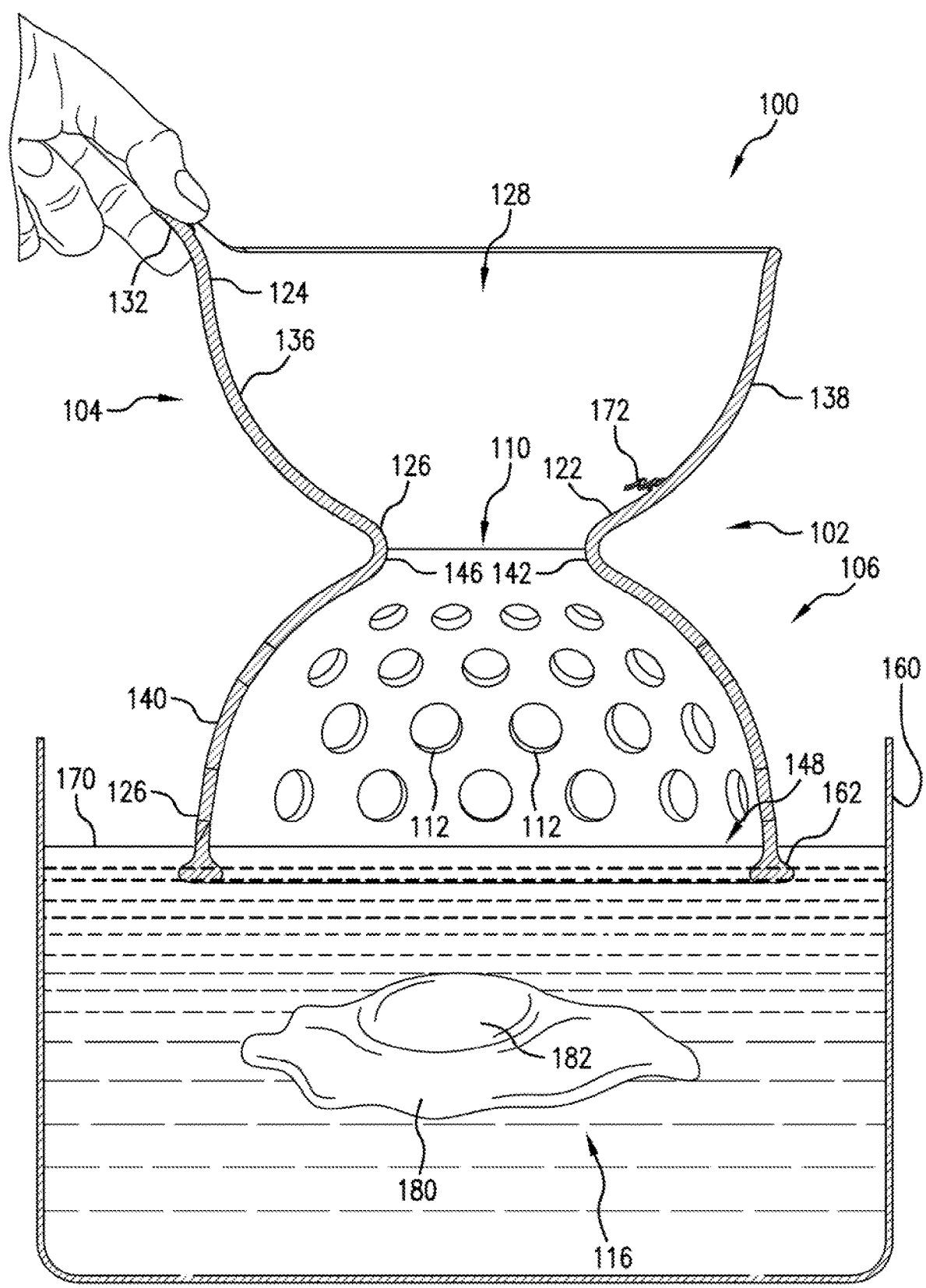

At this point, keeping the cooking fluid 170 in the cooking vessel 160 simmering, the shell of a raw egg 116 is cracked, taking care not to break the yolk. The contents of the raw egg (i.e., egg white 180 and yolk 182) are then gently slipped into the upper portion 104 of the egg poacher 100. It should be appreciated that the cup or funnel shape of upper portion 104 provides a controlled space for the user to comfortably crack an egg into. The contents of the raw egg gently move along the inner surface 136 of the first side wall 120 toward the aperture 110. The first side wall 120 guides and slows down the decent of the egg white 180 and yolk 182 into the cooking fluid 170 (gently introducing the raw egg to the cooking fluid is important for the optimal poached egg). And filling the cooking vessel 160 with the cooking fluid 170 approximately to the fill line 172 indicated on the upper portion 104 further slows down the decent of the raw egg contents and helps to "pre-cook" or set the egg slightly before introducing it fully into the simmering cooking fluid 170 (setting the raw egg quickly is important for the optimal poached egg). It should also be appreciated that the aperture 110 further slows down the decent of the raw egg into the simmering cooking fluid. As depicted in FIG. 8, the aperture 110 is sized such that raw yolk 182 of the egg is generally wrapped in the raw egg white 180 as the raw egg falls through the aperture 110 toward the lower portion 106. Wrapping the yolk 182 in the egg white 180 helps to evenly cook the egg and produces a better-looking poached egg.

The egg is allowed to cook within the egg poacher 100 for a predetermined time, and the lower portion 106 contains the egg and helps prevent the egg from separating. Again, the at least one perforation 112 in the lower portion 106 allows for the flow of the cooking fluid 170 into the lower portion, which promotes faster and more even cooking of the egg. Further, as depicted the perforations 112 are dimensioned to prevent any egg from leaking out of the lower portion 106 during cooking. This is at least partly because the egg white 180 at the periphery of the egg quickly solidifies when in contact with the simmering cooking fluid 170, and once solidified it does not seep out through the perforations 112. Again, the perforations 112 can be of different sizes and/or shapes which allow for retention of the egg contents in the lower portion 106 of the exemplary egg poacher 100. After the predetermined cooking time the egg poacher 100 is withdrawn from the cooking vessel. Again, the upper portion 104 contains the engagement tab 132 that a user can grab with fingers or tongs to remove the egg poacher and reveal the poached egg. The poached egg is then removed from the cooking vessel 160. After removing the egg poacher 100, the upper portion 104 can be folded over the lower portion 106 for a more compact storage of the egg poacher 100.

As is evident from the foregoing, an exemplary method of poaching an egg comprises providing a cooking device 100 in a cooking vessel 160 containing cooking fluid 170 or to be filled with cooking fluid 170. Again, the cooking device 100 includes a body 102 having a cup or funnel shaped upper portion 104, a lower portion 106 having at least opening (e.g., the perforation 112 and/or open bottom 148), and an aperture 110 between the upper and lower portions 104, 106. The method comprises at least partially immersing the lower portion 106 in the cooking fluid 170 as the lower portion rests upon a floor of the cooking vessel 160; introducing a raw egg 116 in the upper portion 104, wherein the aperture 110 is sized such that raw egg yolk 182 is generally wrapped in raw egg white 180 as the raw egg falls through the aperture 110 toward the lower portion 106; and containing the raw egg in the lower portion 106 while cooking. The raw egg can be contained in the lower portion 106 until the raw egg becomes a poached egg, and the method then comprises removing the cooking device 100 from the cooking vessel 160 to provide access to the poached egg. It should be appreciated that at least two poached eggs can be made with a single cooking device 100. For example, a user can introduce a raw egg 116 into the cooking device 100, wait for the raw egg to partially set (e.g., around 30 seconds) and then remove the cooking device, place it in another location in the cooking vessel 160, and then introduce another raw egg into the cooking device. Alternatively, a user can introduce a raw egg 116 into the cooking device 100, wait for the egg to partially set as above, and then drop a second raw egg into the same cooking device 100. After providing the cooking device 100 in the cooking vessel 160 and prior to introducing the raw egg in the upper portion 104, the exemplary method further comprises filling the cooking vessel with the cooking fluid 170 until the cooking fluid reaches a predetermined level within the upper portion 104.

It should be appreciated that any term of degree used herein, such as "substantially" and "approximately" means a reasonable amount of deviation of the modified word is contemplated such that the end result is not significantly changed. It will also be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of poaching an egg comprising:
   providing a cooking device in a cooking vessel, the cooking device including a body having a cup or funnel shaped upper portion, a lower portion having an open bottom, and an aperture between the upper and lower portions;
   introducing a raw egg in the upper portion; and
   containing the raw egg in the lower portion while cooking,
   wherein the body is a unitary, one-piece part, and the method includes forming the body of a flexible material, and
   configuring one of the upper portion and lower portion to at least partially fold over the other of the upper portion and lower portion to an inverted orientation with an outer surface of a sidewall of the inverted one of the upper portion and lower portion facing an outer surface of a sidewall of the other of the upper portion and lower portion, thereby allowing for compact storage of the cooking device.

2. The method of claim 1, including introducing a cooking fluid into the lower portion of the cooking device.

3. The method of claim 2, including at least partially filling the lower portion of the cooking device with the cooking fluid.

4. The method of claim 2, wherein prior to introducing the raw egg in the upper portion, the method includes at least partially filling the cooking vessel with the cooking fluid.

5. The method of claim 4, including at least partially immersing the lower portion of the cooking device in the cooking fluid as the lower portion rests upon a floor of the cooking vessel.

6. The method of claim 4, including filling the cooking vessel with the cooking fluid until the cooking fluid reaches a predetermined level within the upper portion of the cooking device.

7. The method of claim 1, including forming the lower portion as substantially a mirror image of the upper portion with respect to a plane separating the upper and lower portions and transverse to a longitudinal axis of the body.

8. The method of claim 1, including supporting the lower portion of the cooking device directly on a bottom of the cooking vessel in use.

9. The method of claim 1, including forming the lower portion of the cooking device into a cup or funnel shape having an inverted orientation relative to the upper portion.

10. The method of claim 1, including sizing the aperture such that raw egg yolk is at least partially wrapped in raw egg white as the raw egg falls through the aperture toward the lower portion.

11. A method of poaching an egg comprising:
    providing a cooking device in a cooking vessel, the cooking device including a body having a cup or funnel shaped upper portion, a lower portion having an open bottom, and an aperture between the upper and lower portions;
    introducing a raw egg in the upper portion and introducing a cooking fluid into the lower portion of the cooking device;
    sizing the aperture such that raw egg yolk is at least partially wrapped in raw egg white as the raw egg falls through the aperture toward the lower portion; and
    containing the raw egg in the lower portion while cooking.

12. The method of claim 11, wherein prior to introducing the raw egg in the upper portion, the method including at least partially filling the lower portion of the cooking device with the cooking fluid.

13. The method of claim 12, wherein prior to introducing the raw egg in the upper portion, the method includes at least partially filling the cooking vessel with the cooking fluid.

14. The method of claim 13, including at least partially immersing the lower portion of the cooking device in the cooking fluid as the lower portion rests upon a floor of the cooking vessel.

15. The method of claim 11, including supporting the lower portion of the cooking device directly on a bottom of the cooking vessel in use.

16. A method of poaching an egg comprising:
    providing a cooking device in a cooking vessel containing cooking fluid or to be filled with cooking fluid, the cooking device including a body having a cup or funnel shaped upper portion, a cup or funnel shaped lower portion having an open bottom, and an aperture between the upper and lower portions;
    at least partially immersing the lower portion in the cooking fluid as the lower portion rests upon a floor of the cooking vessel;
    introducing a raw egg in the upper portion, wherein the aperture is sized such that raw egg yolk is at least partially wrapped in raw egg white as the raw egg falls through the aperture toward the lower portion; and containing the raw egg in the lower portion while cooking.

17. The method of claim 16, wherein after providing the cooking device in the cooking vessel and prior to introducing the raw egg in the upper portion, filling the cooking vessel with the cooking fluid until the cooking fluid reaches a predetermined level within the upper portion.

\* \* \* \* \*